(12) United States Patent
Droste et al.

(10) Patent No.: US 7,901,120 B2
(45) Date of Patent: Mar. 8, 2011

(54) DECORATIVE UNIT WITH ILLUMINABLE DECORATIVE ELEMENTS

(75) Inventors: Frank Droste, Schwelm (DE); Reiner Kling, Essen (DE); Peter Fleissner, Alzey (DE)

(73) Assignee: CCL Design GmbH, Solingen (DE)

( * ) Notice: Subject to any disclaimer, the term of this patent is extended or adjusted under 35 U.S.C. 154(b) by 279 days.

(21) Appl. No.: 12/195,687

(22) Filed: Aug. 21, 2008

(65) Prior Publication Data

US 2009/0080208 A1  Mar. 26, 2009

Related U.S. Application Data

(60) Provisional application No. 60/935,685, filed on Aug. 27, 2007.

(30) Foreign Application Priority Data

Aug. 22, 2007  (EP) ..................................... 07016439
Aug. 22, 2007  (EP) ..................................... 07016440

(51) Int. Cl.
  *F21V 1/00* (2006.01)
(52) U.S. Cl. .......... 362/509; 362/495; 362/617; 362/511
(58) Field of Classification Search .......... 362/606–607, 362/617–620, 623–627, 501, 495, 509, 511; 40/546–547
See application file for complete search history.

(56) References Cited

U.S. PATENT DOCUMENTS

| | | | | |
|---|---|---|---|---|
| 6,889,456 B2 * | 5/2005 | Shibata et al. | ................... | 40/546 |
| 6,971,758 B2 * | 12/2005 | Inui et al. | ...................... | 362/602 |
| 6,991,359 B2 * | 1/2006 | Leu et al. | ...................... | 362/624 |
| 7,527,416 B2 * | 5/2009 | Lin | ............................... | 362/626 |
| 2001/0040393 A1 | 11/2001 | Sano et al. | | |
| 2001/0046393 A1 | 11/2001 | Uchida | | |
| 2002/0001055 A1 | 1/2002 | Kimura et al. | | |

(Continued)

FOREIGN PATENT DOCUMENTS

DE      10102774      8/2002

(Continued)

OTHER PUBLICATIONS

EP 07016440 European Search Report dated Jan. 14, 2008, 6 pages.

(Continued)

*Primary Examiner* — Jong-Suk (James) Lee
*Assistant Examiner* — Robert J May
(74) *Attorney, Agent, or Firm* — Michael Best & Friedrich LLP (57) ABSTRACT

The invention relates to a decorative unit with illuminable decorative elements (1, 2, 3, 4), in particular a sill strip for positioning on the body of a vehicle, preferably in the region of a door sill, comprising a light-conducting layer (5) into which light can be radiated by an illuminant (6), in particular at least one light emitting diode (LED), disposed to the side, a light-covering decorative element layer (7) disposed over the light-conducting layer (5) with opaque and translucent regions which are designed to correspond to the decorative elements (1, 2, 3, 4), and a reflection layer (8) disposed beneath the light-conducting layer (5), a translucent dispersal layer (10) being disposed between the light-conducting layer (5) and the light-covering decorative element layer (7) disposed over the latter, wherein the translucent dispersal layer (10) contains a coarse fraction of particles with an average grain size in the region of between 30 and 120 μm, and preferably between 60 and 90 μm.

18 Claims, 4 Drawing Sheets

U.S. PATENT DOCUMENTS

| | | |
|---|---|---|
| 2004/0047163 A1 | 3/2004 | Harada et al. |
| 2004/0196646 A1 | 10/2004 | Machi et al. |
| 2005/0213351 A1 * | 9/2005 | Yang .......................... 362/633 |

FOREIGN PATENT DOCUMENTS

| | | |
|---|---|---|
| DE | 200219391 U | 4/2004 |
| DE | 202 19 391 U1 | 5/2004 |
| DE | 202004008681 U | 8/2004 |
| EP | 1662277 | 5/2006 |
| EP | 1715244 | 10/2006 |
| EP | 1816391 | 8/2007 |
| JP | 2005221661 | 5/2008 |
| WO | 2005096045 | 10/2005 |

OTHER PUBLICATIONS

EP07016439 European Search Report dated Jan. 14, 2008, 8 pages.

* cited by examiner

DECORATIVE UNIT WITH ILLUMINABLE DECORATIVE ELEMENTS

RELATED APPLICATIONS

This application claims the benefit of U.S. Provisional Patent Application Ser. No. 60/935,685, filed on Aug. 27, 2007, the contents of which are incorporated herein by reference.

FIELD OF THE INVENTION

The invention relates to a decorative unit with illuminable decorative elements, in particular a sill strip for positioning on the body of a vehicle, preferably in the region of a door sill, according to the preamble to Claim 1.

BACKGROUND OF THE INVENTION

A similar object is described by German Utility Model DE 202 19 391 U1. This relates to a decorative strip with symbols, with a supporting shaped part affixable to the body of a motor vehicle, an electroluminescent luminous film disposed on the supporting shaped part and a light-covering symbol layer, applicable directly or indirectly onto the luminous film and with translucent regions which are formed to correspond to the symbols as decorative elements. This known decorative strip makes it possible to form illuminated writing or other illuminated symbols which can be produced inexpensively and efficiently, great variability and a good optical appearance being provided. The decorative strip has proven to be of value in practice, but differs from a decorative unit of the type specified at the start in that it does not include a light-conducting layer into which light can be radiated by an illuminant disposed to the side, but an electroluminescent luminous film.

A decorative unit of the type specified at the start is known from US 2001/0040393 A1. This document describes an illumination plate for a motor vehicle which comprises a light-conducting plate and a cover in which at least one translucent window is located. A further available reflection layer is formed on the rear and lower side of the light-conducting plate and consists of a white, light-reflective ink, a PVD or CVD layer or a white tape. Alternatively, this layer can be produced by etching, sandblasting or electro-discharge machining. The reflection layer is designed to be slightly larger than the translucent window. Consequently, it does not extend over the whole rear side of the light-conducting plate, but only over specific regions of the latter. Therefore, a high degree of uniformity can be achieved when radiating the light, but this can not be achieved entirely, in particular with large-scale illumination plates. In fact it is shown disadvantageously that the intensity of the light radiated through the at least one window or through a number of available windows becomes weaker as the distance from the illuminant increases.

SUMMARY OF THE INVENTION

The object which forms the basis of the present invention is to specify a decorative unit of the type specified at the start with more uniform intensity distribution of the radiated light, the latter also being guaranteed in particular with larger areas, i.e. with a surface area of more than 100 cm².

This object is achieved by the characterising features of Claim 1.

This dispersal layer prevents details from the reflection layer lying beneath the light-conducting layer, in particular—as will be shown in detail below—a grid of pixels present here, from being visible in the top view. At the same time, by providing a coarse fraction of particles with an average grain size in the region of between 30 and 120 µm, and preferably between 60 and 90 µm, and the resulting space between the dispersal layer and the light-conducting layer, Newton rings are prevented from spreading over the visible surface due to interferences which can occur in the contact region of two thin layers coming into surface contact with one another in particular if moisture gets between these layers.

For this purpose the translucent dispersal layer can have in particular an arithmetical mean deviation of the roughness profile $R_a$ of between 5.0 and 20.0 µm. In order to form the translucent dispersal layer it is advantageously possible, in a technologically uncomplex way, to use an etch imitation paint which can be applied to the light-conducting layer.

Further advantageous design features of the invention are included in the sub-claims and the following description.

In the following the invention will be described in greater detail by means of a preferred exemplary embodiment illustrated in the drawings.

The latter show as follows:

DETAILED DESCRIPTION

In the different figures of the drawings, the same parts are provided with the same reference numbers, and so they are generally also each only described once.

Figure 1:
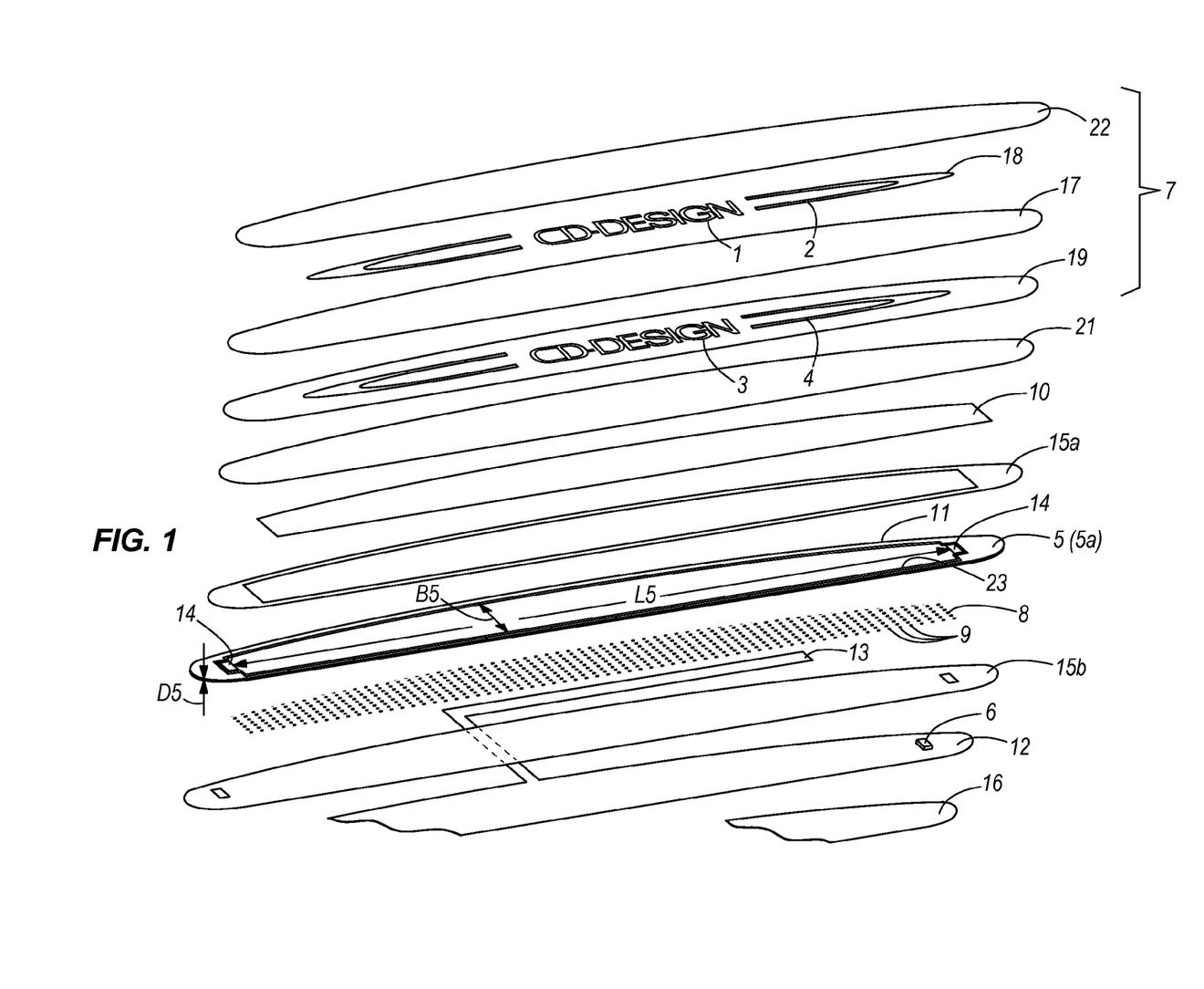
FIG. 1 is a perspective exploded view of a first embodiment of a decorative unit according to the invention with illuminable decorative elements.

First of all, FIG. 1 shows a decorative unit according to the invention which has illuminable decorative elements 1, 2, 3, 4. The latter are for example respectively in the form of writing "CD DESIGN" 1, 3 and of a crescent-shaped decorative ornament 2, 4.

The decorative unit according to the invention can in particular be a sill strip for positioning on the body of a vehicle, preferably in the region of a door sill.

As illustrated, the decorative unit according to the invention comprises a light-conducting layer 5 into which light can be radiated by an illuminant 6 disposed to the side. The illuminant 6 can preferably be one—or as illustrated two—or more light-emitting diodes (LED).

The decorative unit according to the invention further comprises a light-covering decorative element layer 7 made up of a number of part-layers—described in detail below—with opaque and translucent regions disposed over the light-conducting layer 5 and which are designed to correspond to the decorative elements 1, 2, 3, 4, and a reflection layer 8 disposed beneath the light-conducting layer 5.

The reflection layer 8 is formed by a plurality of pixels 9 of different density, size and/or light reflectivity. Advantageously, it is possible here, with low loss of light, to control the upwardly released light intensity for illuminating the decorative elements 1, 2, 3, 4 and to form it exceptionally evenly in relation to the surface of the decorative unit according to the invention. For this purpose e.g. a surface covering level of the pixels 9 can be specifically varied, preferably in the region of between 20 and 80 percent. It is therefore possible, without any problem, to illuminate a surface of at least 150 cm² evenly with just—as illustrated—two diametrically opposed LEDs.

The reflection layer 8 can in particular be formed from a printed layer applied to the lower side of the light-conducting layer 5, preferably from a printed layer applied using the screen printing technique, or also by engraving the light-conducting layer 5.

Although it is preferred in the case of print to use white colouring due to the advantageously low light absorption, the light reflectivity could not only be controlled by a thickness of the printed layer—but also by a colour different to white.

A grid of pixels 9 can be determined according to the physiological resolving capacity of the human eye and according to the preferred application of the decorative unit according to the invention. Since the eye can still resolve structures of up to 0.3 mm at an observation distance of approximately half a meter, the grid of pixels 9 should be in the region of between 18 and 120 per cm, and preferably in the region of between 36 and 80 per cm. In this way the changes in density, size and/or light reflectivity of the pixels 9—present in discretised form—can be detected by the eye quasi-continuously. A grid density of greater than 120 per cm does not seem advantageous, however, because the technological complexity required to produce the grid would increase disproportionately to the optical quality and homogeneity of the illumination achieved.

In order to control a quantity of light released—upwardly in relation to the drawn illustration—and an intensity, provision can be made such that the intensity, size and/or light reflectivity of the pixels 9 are set dependently upon the geometry of the light-conducting layer 5, such as the (optically effective) length L5, width B5 and thickness D5 of the latter. Moreover, it is also possible to coordinate the density, size and/or light reflectivity of the pixels 9 with the optical properties of the material of the light-conducting layer 5, such as the absorption capacity or refraction index of the latter.

Likewise, furthermore, one can make allowance for the intensity of the illuminant 6 by choosing a smaller density, size and/or light reflectivity of the pixels with a greater intensity than with a lesser intensity.

The density, size and/or light reflectivity of the pixels 9 beneath the opaque regions of the light-covering decorative element layer 7 can also be smaller than beneath the translucent regions, it also being possible—corresponding to non-vertical release of the light—for a covered edge surrounding the translucent regions to have a comparably greater density, size and/or light reflectivity of the pixels 9 than the rest of the covered surrounding area.

Figure 3:
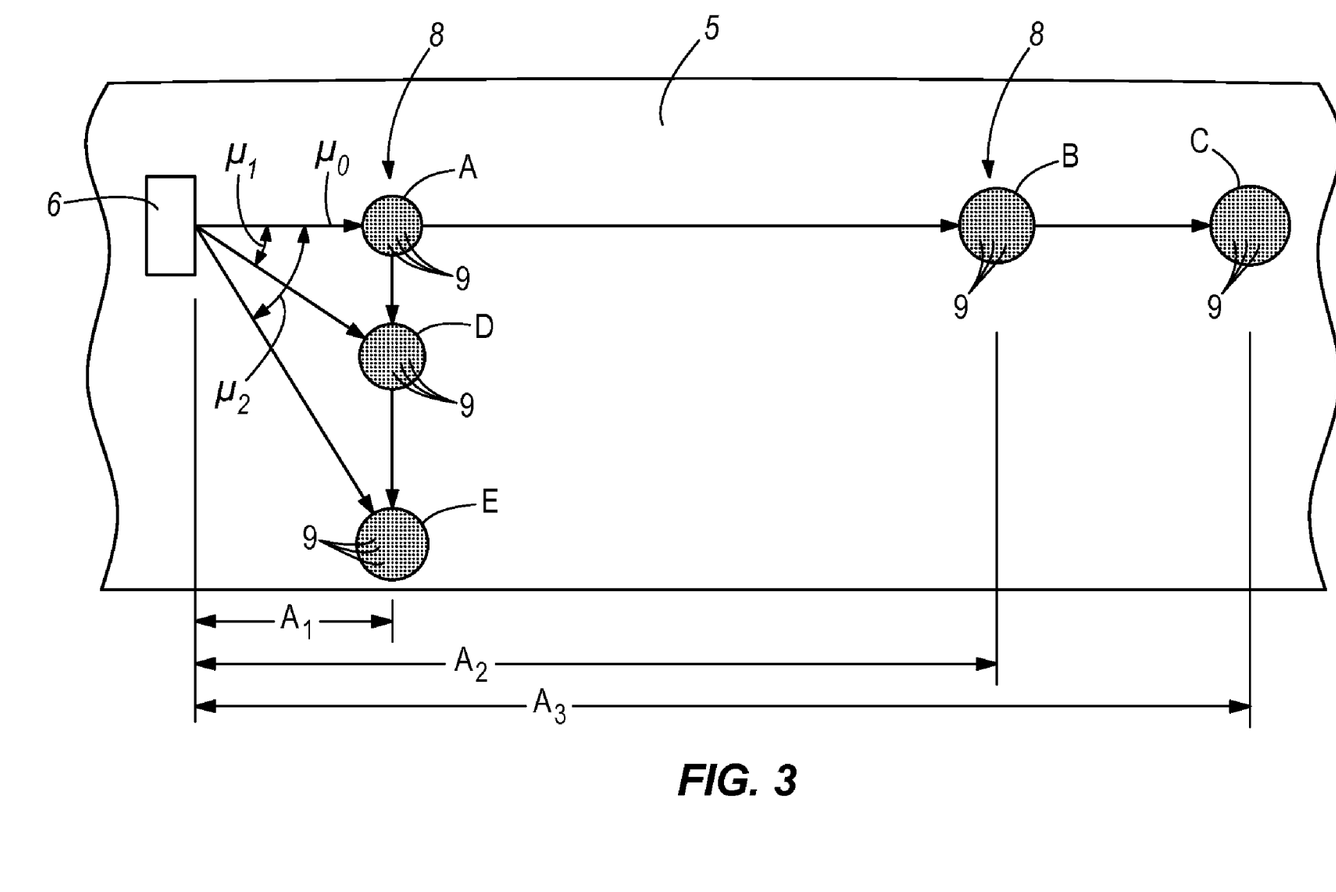

Finally, there are still further possibilities for controlling the radiated light which are illustrated by FIG. 3. Therefore, provision can advantageously be made such that the density, size and/or light reflectivity of the pixels 9 of the reflection layer 8 illustrated in sections are set dependently upon their distance $A_1, A_2, A_3$ from the illuminant 6, in particular with a greater distance $A_2$ (regions B and C), $A_3$ from the illuminant 6 is greater than with a smaller distance $A_1$ (regions A, D, E) from the illuminant 6.

If, however, region C is a covered region, despite the greater distance ($A_3 > A_2$), the density, size and/or light reflectivity of the pixels 9 could—as already stated—be smaller here than in region B if the latter is not a covered region.

FIG. 3 also shows that it is advantageously possible to set the density, size and/or light reflectivity of the pixels 9 dependently upon their angular position in relation to the illuminant 6, where the latter, in particular with a greater angular position $\mu_2$ in relation to the vertical radiation direction of the illuminant 6 (in region E), is greater than with a smaller angular position $\mu_1$ in relation to the radiation direction of the illuminant 6 (region D) or directly in the direction of radiation (region A).

If however, for example, region A is a covered region, despite the angular position $\mu_0 = 0°$, the density, size and/or light reflectivity of the pixels 9 could be greater here than in region D if the latter is not a covered region.

According to the invention, in order to achieve more even intensity distribution of the radiated light, and in order to guarantee small losses of light when radiating light, a translucent dispersal layer 10 is disposed between the light-conducting layer 5 and the light-covering decorative element layer 7 disposed above the latter. This dispersal layer 10 prevents the grid of pixels 9 from being visible in the top view, and at the same time one thus also prevents Newton rings from being able to form due to interference on thin layers. For this purpose the translucent dispersal layer 10 has in particular an arithmetical mean deviation $R_a$ of between 5.0 and 20.0 µm, and preferably between 8.0 and 14.0 µm. Optimal results were achieved with a mean deviation $R_a$ of 11.7 µm.

The translucent dispersal layer 10 should for the purpose of a high light yield for illumination of the decorative elements 1, 2, 3, 4 have a transmission level of at least 0.5, and preferably of at least 0.8. Its effect is based here less upon clouding than upon light dispersal, i.e. when passing through the dispersal layer 10 the light obtains an optical path with a high proportion of undirected, diffuse radiation components.

In order to form the translucent dispersal layer 10 it is advantageously possible, in a technologically non-complex way, to use an etch imitation paint which can be applied to the light-conducting layer 5. The translucent dispersal layer 10 can thereby contain a coarse fraction of particles with an average grain size in the region of between 30 and 120 µm, and preferably between 60 and 90 µm. Moreover, provision can be made such that the translucent dispersal layer contains a fine fraction of particles with an average grain size in the region of less than 15 µm.

The fine fraction can in turn preferably be a mixture of a first part-fraction of particles with an average grain size in the region of between 1.8 and 2.4 µm and of a second part-fraction of particles with an average grain size in the region of between 8.0 and 12.0 µm, the fine fraction in particular being a mixture of between 35 and 65 parts of the first part-fraction and between 65 and 35 parts of the second part-fraction, and preferably each half consisting of the two part-fractions.

Advantageously, provision can then be made overall such that the translucent dispersal layer consists by 60 to 95 percent, and preferably by 78 to 93 percent, of a paint, by 2.5 to 20 percent of the coarse fraction of particles with an average grain size in the region of between 30 and 120 µm, and by 2.5 to 20 percent of the fine fraction of particles with an average grain size in the region of less than 15 µm.

On the one hand, in this way the desired effect can be achieved, but the setting of an undesirably high opacity and the occurrence of opalescence can be totally avoided.

Optimal results were achieved with a formula which consisted by 88 percent of an etch imitation paint, by 6 percent of a first pigment fraction with a grain size—assumed here to be distributed normally—in the region of between 60 and 90 µm and by a further 6 percent of a second pigment fraction which respectively consisted by the same parts of a first part-fraction with an average grain size of 2.1 μm and of a second part-fraction with an average grain size of 10.0 μm. The application was implemented by means of screen printing with a 43 fabric (43×43 stitches per cm$^2$).

The light-conducting layer 5 and the light-covering decorative element layer 7 can—as illustrated in FIG. 1—be connected advantageously by adhesive bonding, in particular by means of a dual-effect self-adhesive film 15$a$, preferably only disposed at the edge (indicated by reference number 11 on the light-conducting layer 5), enclosing the dispersal layer.

As shown, a flexible conductor 12 (Flexible Printed Circuit—FPC) can be disposed beneath the light-conducting layer 5 which in particular has a seamless outgoing line connection 13. The flexible conductor 12 can, preferably on its surface, be equipped with all of the components required for illumination, and in particular with the illuminant 6 such as one or more light emitting diodes (LED). With the exception of the LEDs, these components can however also be accommodated at other locations, e.g. on a connecting plug (not shown).

The light-conducting layer 5 can in turn have complementary holding pockets 14 for the components required for illumination, in particular for the illuminant(s) 6. Here the components required for illumination, such as the light emitting diodes 6 illustrated, can be cast integrally into the light-conducting layer 5 by means of a transparent casting material. The light conductor and the components are thus combined to form one unit.

The light-conducting layer 5 and the flexible conductor 12 can advantageously be connected by adhesive bonding, in particular by means of a dual-effect self-adhesive foil 15$b$ lying over the whole surface of the light-conducting layer 5 and the flexible conductor 12.

On the lower side of the decorative unit according to the invention a further adhesive layer 16, preferably a self-adhesive foam adhesive film, can be disposed in particular on the lower side of the flexible conductor 12 in order to connect to the body of the vehicle.

The light-conducting layer 5 and the light-covering decorative element layer 7 and, if appropriate, the flexible conductor 12 and the adhesive layers 15$a$, 15$b$, 16 can be designed in particular congruently or at least with the same outer contour.

By means of the technical features specified above potential penetration points for moisture are advantageously directly eliminated, and so effective protection against moisture and also against jolts is achieved.

As already mentioned, the light-covering decorative element layer 7 disposed over the light-conducting layer 5 can comprise a number of part-layers. Here a different structure is possible, and this is why the exemplary embodiment of the invention illustrated in FIG. 1 differs from the example illustrated in FIG. 2.

Figure 2:
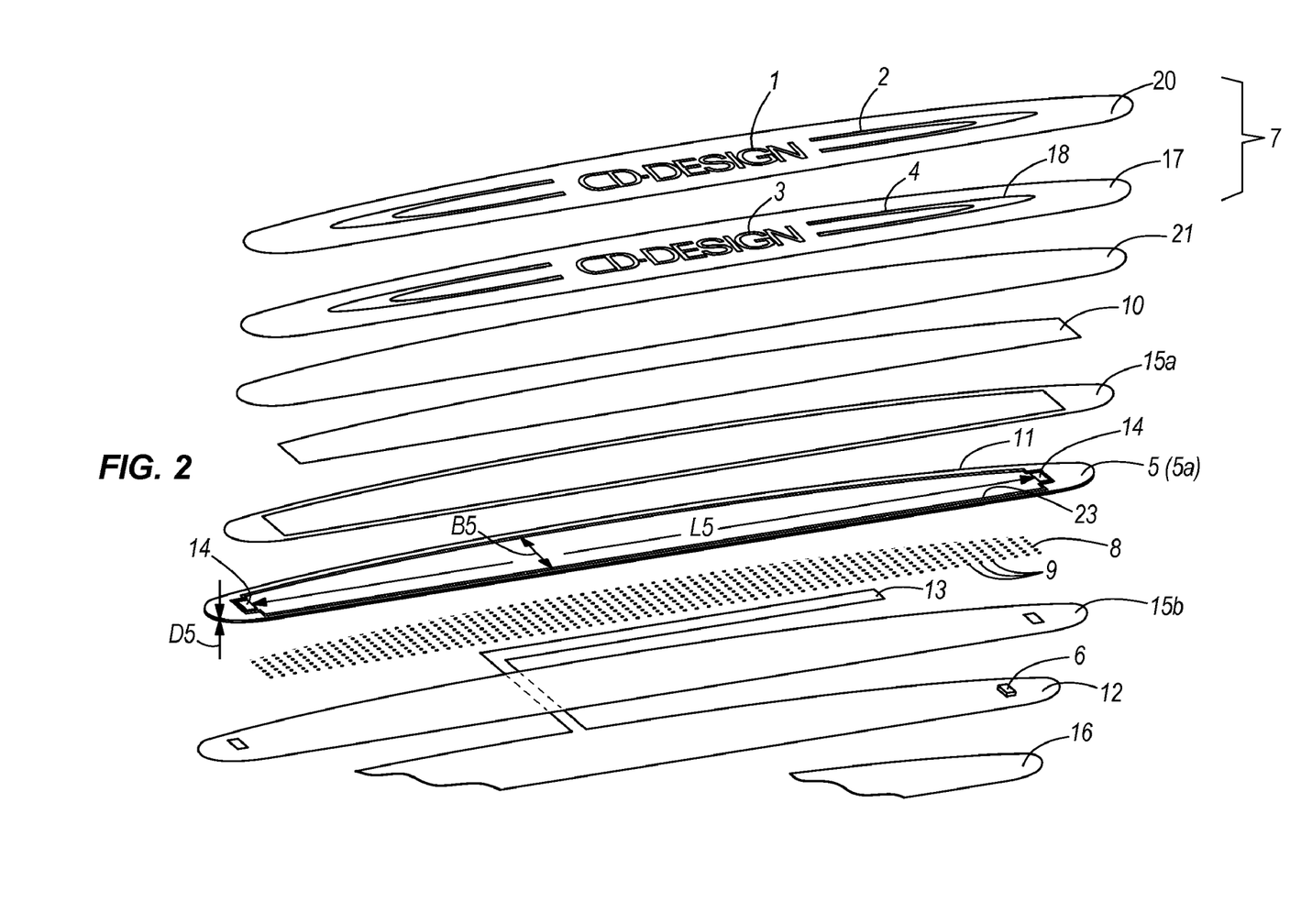
FIG. 2 is a perspective exploded view of a second embodiment of a decorative unit according to the invention, FIG. 3 in an enlarged view, an individual illustration of a reflection layer of a decorative unit according to the invention, FIG. 4 in an enlarged, perspective, cross-sectional view, a diagrammatic illustration of a section from an alternatively designed light-conducting layer of a decorative unit according to the invention.

Both in FIG. 1 and in FIG. 2 the light-covering decorative element layer 7 comprises one—but possibly also two or more—transparent plastic part-layer(s) 17 which can, for example, be made of polymethacrylic acid methyl ester (PMMA).

In the embodiment according to FIG. 1, the opaque regions of the light-covering decorative element layer 7 are formed by two printed layers 18, 19 applied to the plastic part-layer 17 in different planes. A first printed layer 18 is applied to the upper side of the plastic part-layer 17, and a second printed layer 19 to the lower side of the latter. As already shown, different motifs can be produced with the decorative elements 1, 2, 3, 4 by certain regions being covered, and others not being covered. Light is shone through the non-covered regions. By applying covering layers in different planes such as the two printed layers 18, 19 one can thus advantageously succeed in giving the observer the impression of a plastic effect, i.e. a so-called 3D effect.

Alternatively, or in addition—as shown in FIG. 2—the opaque regions of the light-covering decorative element layer 7 can also be formed by a support layer 20 made in particular of metal, such as aluminium. This support layer 20 can preferably have a thickness of approximately 0.3 to 1.0 mm. Covering can therefore be implemented by a non-transparent material and/or by a material which is originally transparent and which loses its transparency when processed, e.g. when paint is applied.

By means of an additionally provided optional transparent paint layer 21 (shown for both embodiments) which is applied to the light-covering decorative element layer 7, in particular to the lower side of the latter, any light colours can be shown.

Finally, as shown by FIG. 1, the decorative unit according to the invention can have a translucent protective layer 22 disposed at least on the upper side which is preferably formed by a casting compound covering the surface or a resin which can be made in particular of polyurethane or acrylate. The coating can be applied for example with a layer thickness of between approximately 0.15 and 2.0 mm, and also comprise two components which react with one another when hardening, as is the case e.g. with epoxy resins. The protective layer 22 can also cover the side edges of the decorative unit.

As regards the light-conducting layer 5, the latter is advantageously designed such that it is almost totally optically decoupled from the surroundings, and for this reason only experiences marginal losses of light due to dispersed light. In the embodiments of the invention shown in FIGS. 1 and 2, the light-conducting layer 5 is formed by a light-conducting plate 5$a$ the thickness D5 of which can lie within the region of between approximately 0.5 and 10 mm. Here, in order to achieve optimal optical decoupling, provision can be made such that the light-conducting plate 5$a$ has in its top surface, and formed on the edge 11, a preferably almost totally circumferential groove 23 the depth of which is in particular between 80 and 95 percent of the thickness D5 of the light-conducting layer 5, but preferably minimum 0.2 mm.

Figure 4:
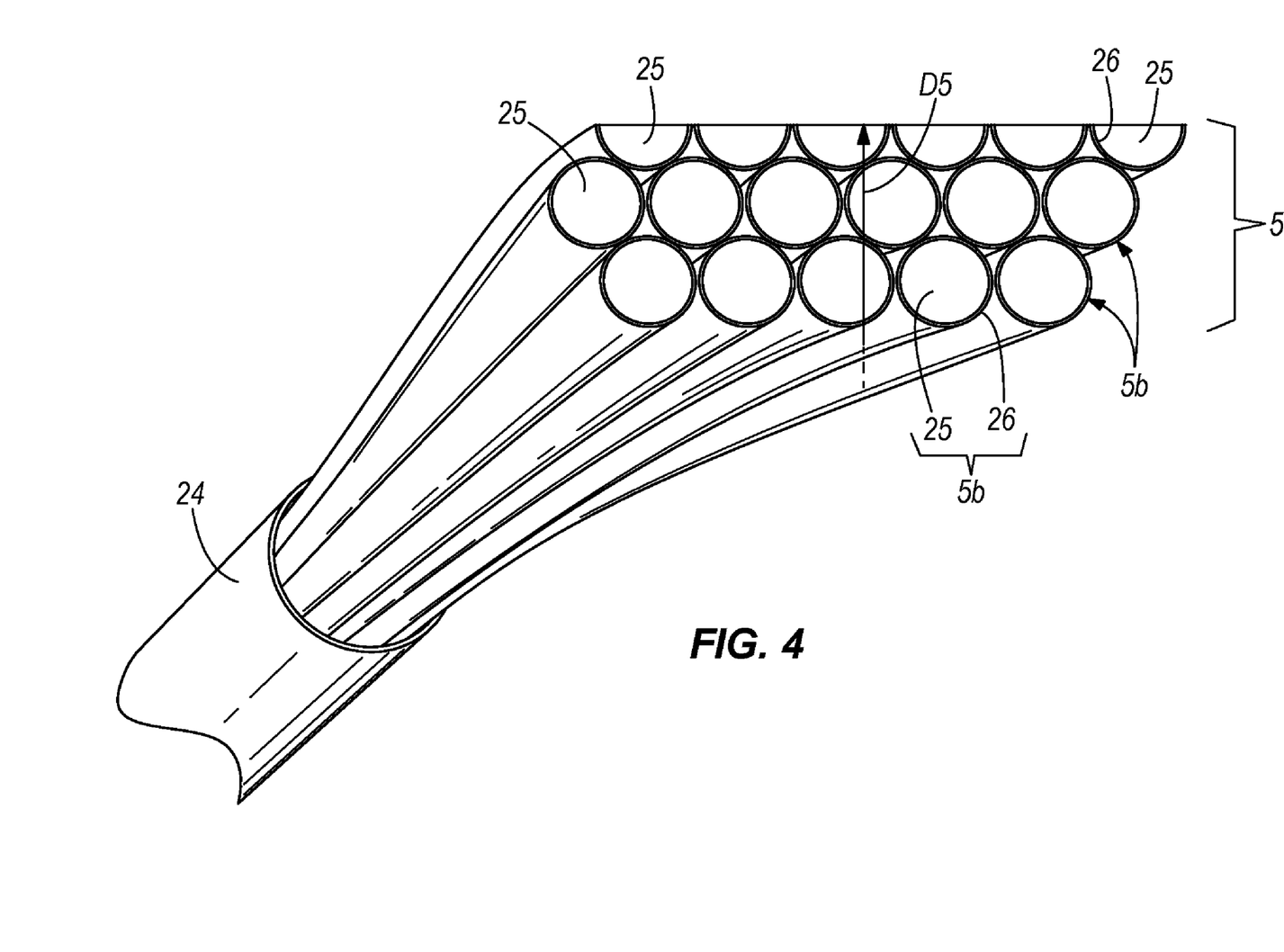

In an alternatively designed light-conducting layer 5 of a decorative unit according to the invention, as shown by FIG. 4, provision can also be made such that this light-conducting layer 5 is formed by a bundle of optical fibres 5$b$, in particular fanned out two-dimensionally, which are disposed over one another at one location or at a number of locations. The thickness D5 of the layer 5 can be smaller here than with a plate 5$a$ and have for example a lower limit in the region of 0.15 mm.

In the embodiment illustrated, the optical fibres 5$b$ lead into a light conducting cable which can, for example, be a glass fibre cable 24. These types of glass fibre cable 24 are generally made of highly transparent glass fibres which are mostly made of very pure silica glass and are clad with a glass which is less susceptible to breaking. The optical fibre 5$b$ itself is made of a core 25, a cladding 26 and optionally a coating and/or buffer.

The light-guiding core 25 serves e.g. to transmit an optical signal. The cladding 26 has a lower optical refractive index than the core 25, the effect of which is total reflection on the limit layer, and so predominant guiding of the radiation within the core 25 of the fibre optic cable. Part of the light wave also occurs in the cladding 26, but not on the outer surface of the latter.

The outer coating forms protection against mechanical damage and mainly comprises a 150-500 μm thick coating of special plastic (mostly polyimide, acrylic or silicone) which also protects the fibres 5b against moisture. Without the coating the micro-cracks present on the fibre surface would lead to a substantial reduction in the mechanical resilience.

Whereas in the right half of the drawn illustration this total structure of the optical fibres 5b is shown, the left half shows a fibre structure where the cladding 26 or the outer coating has been removed. This means that total reflection no longer occurs, and the light can be radiated out of the optical fibres 5b, and so be optically released in order to illuminate the decorative element layer 7.

As already emerges from the explanations given above, the invention is not restricted to the exemplary embodiments illustrated, but also includes all embodiments with the same effect in accordance with the invention. Therefore, the pixels 9 must not necessarily be circular image elements, but the "dots" can also e.g. be oval or square in form or cross-shaped. The reflection layer 8 and the dispersal layer 10 must not necessarily be applied by a print process, but could, as stated at the start when presenting the known prior art, be produced using some other suitable method, such as e.g. lasering, engraving or cutting. When using optical fibres 5b those made of different types of material, different thicknesses and different types of cross-section can be used, as indicated in FIG. 4 by the illustration of optical fibres with a D and an 0 cross-section. Casting of the fibres also seems to be basically possible here.

The decorative unit according to the invention can also be geometrically different from the exemplary embodiments shown. It can therefore also be, for example, a cube, a sphere or some other three-dimensional object.

The area of application of the decorative unit according to the invention is not restricted to motor vehicle technology, but can advantageously also be used in the furniture industry, in the architectonic field, in advertising or in further suitable fields.

Furthermore, the invention is not restricted to the combination of features defined in Claim 1, but can also be defined by any other combination of specific features from all of the individual features defined overall. This means that basically practically any individual feature of Claim 1 can be left out or be replaced by at least one of the individual features disclosed at another point of the application. In this respect, Claim 1 is only to be understood as being a first attempt at formulating an invention.

What is claimed is:

1. A decorative unit with illuminable decorative elements, in particular a sill strip for positioning on the body of a vehicle, preferably in the region of a door sill, the decorative unit comprising:
    a light-conducting layer into which light is radiated by an illuminant, in particular at least one light emitting diode (LED),
    a light-covering decorative element layer disposed above the light-conducting layer, the light-covering decorative element layer including opaque and translucent regions which correspond to the decorative elements,
    a reflection layer disposed beneath the light-conducting layer, and
    a translucent dispersal layer being disposed between the light-conducting layer and the light-covering decorative element layer,
    wherein the translucent dispersal layer contains a mixture of a coarse fraction of particles and a fine fraction of particles, and
    wherein the fine fraction of particles includes an average grain size in the region of less than about 15 µm, and further
    wherein the fine fraction of particles with an average grain size in the region of less than about 15 µm comprises a mixture of a first part-fraction of particles with an average grain size in the region of between about 1.8 µm and about 2.4 µm and of a second part-fraction of particles with an average grain size in the region of between about 8.0 µm and about 12.0 µm, and in particular of a mixture of about 35 parts to about 65 parts of the first part-fraction and about 65 parts to about 35 parts of the second part-fraction, preferably each half consisting of the two part-fractions.

2. The decorative unit according to claim 1, wherein the translucent dispersal layer is formed by an etch imitation paint.

3. The decorative unit according to claim 1, wherein the reflection layer is formed by a plurality of pixels the density, size and/or light reflectivity of which are set dependently upon their distance ($A_1$, $A_2$, $A_3$) from the illuminant, in particular with a greater distance ($A_2$, $A_3$) from the illuminant is/are greater than with the smaller distance ($A_1$, $A_2$) from the illuminant, and is/are set dependently upon their angular position ($\mu_0$, $\mu_1$, $\mu_2$) in relation to the illuminant, in particular with a greater angular position ($\mu_2$) in relation to the vertical radiation direction ($\mu_0$) of the illuminant is/are greater than with a smaller angular position ($\mu_1$) in relation to the vertical radiation direction ($\mu_0$) of the illuminant.

4. The decorative unit according to claim 3, wherein the density, size and/or light reflectivity of the pixels beneath the opaque regions of the light-covering decorative element layer is/are smaller than beneath the translucent regions of the decorative element layer.

5. The decorative unit according to claim 1, wherein the reflection layer is formed from a printed layer applied to an underside of the light-conducting layer, in particular from a printed layer applied by the screen printing method, or by engraving in the light-conducting layer.

6. The decorative unit according to claim 1, wherein the light-conducting layer has holding pockets for components required for illumination, in particular for the illuminant, and/or at least the illuminant is integrally moulded into the light-conducting layer by means of a transparent casting material.

7. The decorative unit according to claim 1, wherein the light-covering decorative element layer comprises one or more transparent plastic part-layer(s), made for example of polymethacrylic acid methyl ester (PMMA) and/or a transparent colour layer is applied to the light-covering decorative element layer, in particular to the lower side of the latter.

8. The decorative layer according to claim 1 wherein the opaque regions of the light-covering decorative element layer are formed by one or more printed layer(s), in particular printed layers disposed in different planes on plastic part-layer(s), or by a support layer made of metal, such as aluminium.

9. The decorative unit according to claim 1, further comprising a translucent protective layer disposed at least on an upper layer of the decorative element layer, which is preferably formed by a casting component covering at least a portion of a surface of the translucent protective layer, or by a resin, in particular made of polyurethane or acrylate.

10. A decorative unit with illuminable decorative elements, in particular a sill strip for positioning on the body of a vehicle, preferably in the region of a door sill, the decorative unit comprising:
    a light-conducting layer into which light is radiated by an illuminant, in particular at least one light emitting diode (LED), a light-covering decorative element layer disposed above the light-conducting layer, the light-covering decorative element layer including opaque and translucent regions which correspond to the decorative elements, a reflection layer disposed beneath the light-conducting layer, and a translucent dispersal layer being disposed between the light-conducting layer and the light-covering decorative element layer, wherein the translucent dispersal layer contains a mixture of paint, a coarse fraction of particles, and a fine fraction of particles, wherein the mixture includes about 60 percent to about 95 percent, and preferably includes about 78 percent to about 93 percent, of a paint, about 2.5 percent to about 20 percent of the coarse fraction of particles with an average grain size in the region of between about 30 μm and about 120 μm, and by about 2.5 percent to about 20 percent of the fine fraction of particles with an average grain size in the region of less than about 15 μm.

11. A decorative unit with illuminable decorative elements, in particular a sill strip for positioning on the body of a vehicle, preferably in the region of a door sill, the decorative unit comprising:

a light-conducting layer into which light is radiated by an illuminant, in particular at least one light emitting diode (LED), a light-covering decorative element layer disposed above the light-conducting layer, the light-covering decorative element layer including opaque and translucent regions which correspond to the decorative elements, and a reflection layer disposed beneath the light-conducting layer, the reflection layer being formed by a plurality of pixels the density, size and/or light reflectivity of which are set dependently upon their distance ($A_1$, $A_2$, $A_3$) from the illuminant, wherein with a greater distance ($A_2$, $A_3$) from the illuminant the density, size and/or light reflectivity is/are greater than with the smaller distance ($A_1$, $A_2$) from the illuminant, and is/are set dependently upon their angular position ($\mu_0$, $\mu_1$, $\mu_2$) in relation to the illuminant, wherein the density, size and/or light reflectivity and is/are set dependently upon their angular position ($\mu_0$, $\mu_1$, $\mu_2$) in relation to the illuminant, and further comprising a translucent dispersal layer being disposed between the light-conducting layer and the light-covering decorative element layer, wherein the translucent dispersal layer contains a mixture of paint, a coarse fraction of particles, and a fine fraction of particles, wherein the mixture includes about 60 percent to about 95 percent, and preferably includes about 78 percent to about 93 percent, of a paint, about 2.5 percent to about 20 percent of the coarse fraction of particles with an average grain size in the region of between about 30 μm and about 120 μm, and about 2.5 percent to about 20 percent of the fine fraction of particles with an average grain size in the region of less than about 15 μm.

12. The decorative unit according to claim 11, wherein with a greater angular position ($\mu_2$) in relation to the vertical radiation direction ($\mu_0$) of the illuminant the density, size and/or light reflectivity is/are greater than with a smaller angular position ($\mu_1$) in relation to the vertical radiation direction ($\mu_0$) of the illuminant.

13. The decorative unit according to claim 11, wherein the density, size and/or light reflectivity of the pixels beneath the opaque regions of the light-covering decorative element layer is/are smaller than beneath the translucent regions of the decorative element layer.

14. The decorative unit according to claim 11, wherein the reflection layer is formed from a printed layer applied to an underside of the light-conducting layer, in particular from a printed layer applied by the screen printing method, or by engraving in the light-conducting layer.

15. The decorative unit according to claim 11, wherein the light-conducting layer has holding pockets for components required for illumination, in particular for the illuminant, and/or at least the illuminant is integrally moulded into the light-conducting layer by means of a transparent casting material.

16. The decorative unit according to claim 11, wherein the light-covering decorative element layer comprises one or more transparent plastic part-layer(s), made for example of polymethacrylic acid methyl ester (PMMA) and/or a transparent colour layer is applied to the light-covering decorative element layer, in particular to the lower side of the latter.

17. The decorative unit according to claim 11, wherein the opaque regions of the light-covering decorative element layer are formed by one or more printed layer(s), in particular printed layers disposed in different planes on plastic part-layer(s), or by a support layer made of metal, such as aluminium.

18. The decorative unit according to claim 11, further comprising a translucent protective layer disposed at least on an upper layer of the decorative element layer, which is preferably formed by a casting component covering at least a portion of a surface of the translucent protective layer, or by a resin, in particular made of polyurethane or acrylate.

* * * * *